Figure 1:
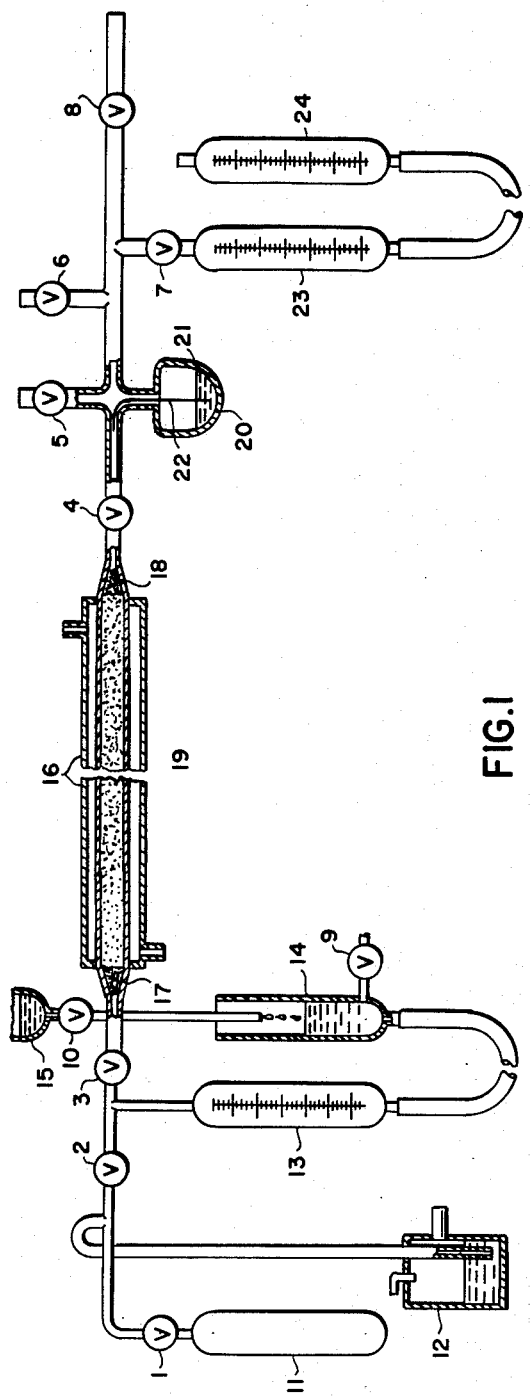

Dec. 31, 1963  J. F. HALLER ETAL  3,116,132
PROCESS FOR THE ADSORPTION AND DESORPTION OF DIBORANE
Filed Jan. 22, 1960  2 Sheets-Sheet 1

John F. Haller
Robert D. Twelves
INVENTORS

BY

ATTORNEY

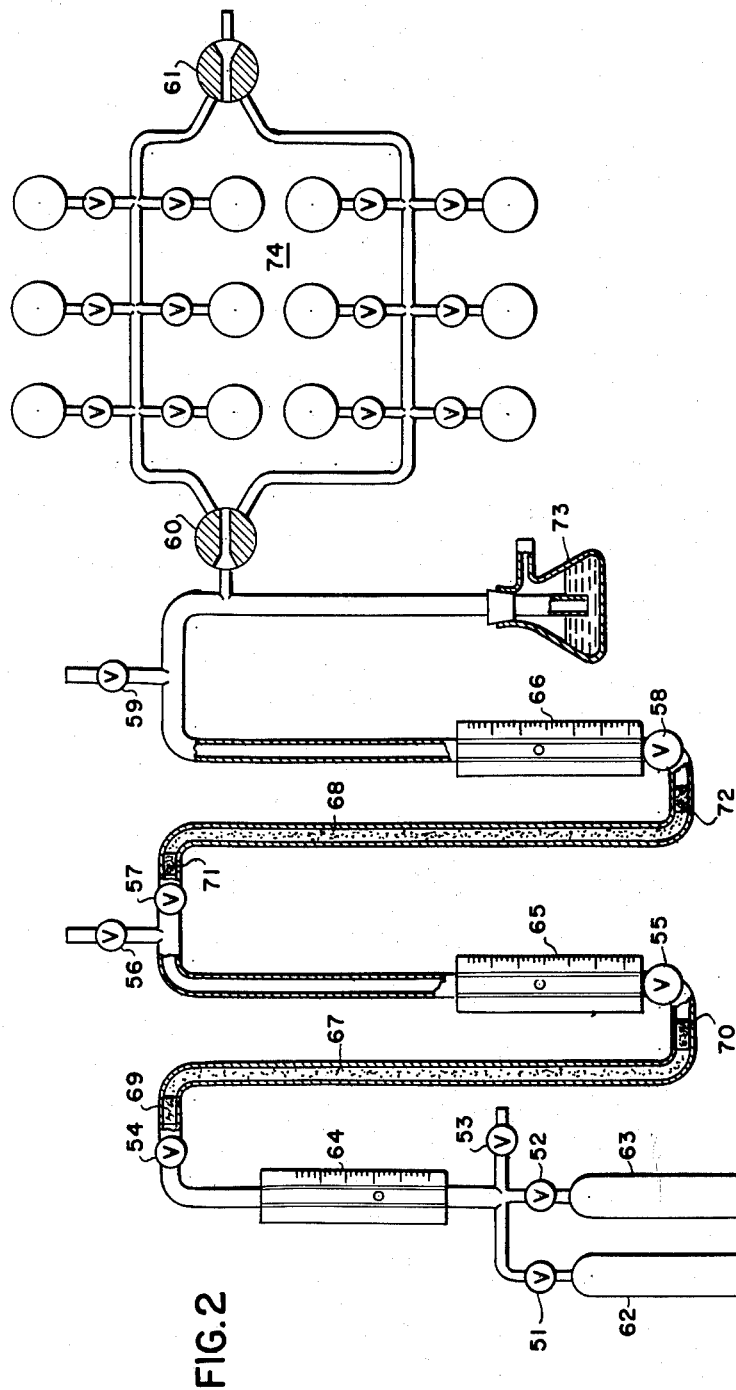

United States Patent Office 3,116,132
Patented Dec. 31, 1963

3,116,132
PROCESS FOR THE ADSORPTION AND DESORPTION OF DIBORANE
John F. Haller, Mount Carmel, and Robert D. Twelves, Northford, Conn., assignors to Olin Mathieson Chemical Corporation, a corporation of Virginia
Filed Jan. 22, 1960, Ser. No. 4,156
11 Claims. (Cl. 55—58)

This invention relates to the separation of ethane and diborane from gaseous admixtures containing the same.

In patent application Serial No. 803,536, filed April 1, 1959, in the name of Arthur D. Bliss, and assigned to the assignee of this application but now abandoned, it has been proposed to produce diborane by the hydrogenation of trialkylboranes, more particularly triethylborane. Ethane is found in the product gas from this hydrogenation reaction in admixture with diborane. Separation of ethane from the product diborane is generally necessary and can be effectively accomplished by the processes of this invention.

This invention is based on the discovery that activated carbon selectively adsorbs diborane from a gaseous admixture containing ethane and diborane and that the diborane so adsorbed can be displaced with boron trichloride or boron trifluoride. The boron trihalide can be desorbed and the activated carbon is then ready for another cycle.

In a preferred embodiment of the invention, a gaseous admixture comprising ethane and diborane is passed into the inlet end of an elongated adsorption zone into intimate contact with a confined body of finely divided activated carbon maintained in the elongated adsorption zone and ethane is withdrawn from the exit end of the adsorption zone. When diborane appears in the gaseous admixture passing a point approximately halfway intermediate the inlet and exit ends of the adsorption zone, the flow of the gaseous mixture comprising ethane and diborane passing into the inlet end of the adsorption zone is terminated and replaced with a boron halide. The gas effluent withdrawn from the adsorption zone then has the following profile:

(1) A fraction of substantially pure ethane.
(2) A small fraction containing ethane and diborane.
(3) A fraction of substantially pure diborane.
(4) A small fraction containing diborane and boron halide.
(5) Pure boron halide.

The second fraction can be recycled for further separation and the fifth fraction can be used in another cycle. The boron halide employed advantageously is the same employed in the production of the ethane-diborane charge admixture so that the fourth fraction can be recycled to that reaction system. It has been found, however, that boron trifluoride is only about 70% as efficient as boron trichloride in displacing diborane from the activated charcoal.

Boron halide adsorbed on the activated carbon in the adsorption zone is then desorbed by heating and evacuating or by heating and displacement with an inert gas such as nitrogen or helium thereby preparing activated carbon in the adsorption zone for another cycle.

The processes of the invention are illustrated in detail by the following examples in which two general types of experiments were conducted in the equipment shown in FIGURES 1 and 2 of the drawings respectively. In the first type, adsorption separation, a mixture of ethane and diborane was passed into a column of activated carbon until diborane was first detected in the effluent gas. In these experiments, separation efficiency was defined as Separation efficiency (percent)
$$= \frac{\text{Amount pure ethane recovered in effluent before diborane appearance}}{\text{Total amount of ethane admitted in gas mixture}} \times 100$$

In the second type, adsorption-displacement separation, a mixture of ethane and diborane was passed into the first of two columns of activated carbon of about equal size until diborane was first detected in the effluent gas from the first column. Boron trichloride was then introduced into the first column in place of the ethane-diborane mixture and the effluent from the first column was passed into the second column.

In the experimental work, Columbia Activated Charcoal, grade CXA was used. It was ground and screened to give an 8–12 mesh fraction. Its apparent density was 0.5; its absolute density (determined by helium displacement) was 2.04. The charcoal was placed in a tared flask or tube where it was heated to 350° C. and evacuated for a period of two hours. Dry nitrogen or helium was then admitted and the required amount of carbon transferred to a tube prepared to form the adsorption column. The weight of carbon contained in the adsorption column was known by difference in weight of the tared flask before and after carbon transfer.

The carbon was saturated in place in the adsorption tube with boron trichloride. It was then heated for one hour at 350° C. with dry nitrogen flowing through the tube at 5–10 cc. per minute. It was then evacuated for one hour during cooling and finally backfilled with dry nitrogen or helium. Helium was used when it was required that no inert gas adsorption occur. The treatment, as above, with boron trichloride left boron trichloride adsorbed on the carbon in an amount about 3% by weight of the carbon and reduced adsorption capacity. The scheme was used, however, to simulate carbon which had already undergone one cycle of the process of the invention. Subsequent admission of diborane-ethane mixed gas failed to dislodge any of this residual adsorbed boron trichloride.

ADSORPTION SEPARATION

The equipment employed in these experiments is shown in FIGURE 1 of the drawings wherein numbers 1 through 10 designate stopcocks in the system. The system itself includes gas supply cylinder 11, mercury "bubble-off" 12, graduated gas supply cylinder 13, mercury leveling bulb 14, mercury supply reservoir 15, jacketed reactor 16 containing glass wool plugs 17 and 18 at each end and carbon column 19, well 20 containing a one-tenth normal silver nitrate solution 21 and filter paper strip 22, graduated gas collection bulb 23 and mercury leveling bulb 24.

Ethane and diborane were accurately measured in a calibrated portion of a high vacuum line (not shown) and were condensed into gas supply cylinder 11 using liquid nitrogen. (Hydrogen and higher boranes present in the diborane were removed prior to its measurement.) The cylinder 11 (with stopcock 1 closed) was attached to the system and the system was evacuated through stopcock 5; stopcocks 2, 3, 4, 5 and 7 being open, the others closed. Stopcock 3 was then closed, vacuum shut off at 5 and helium admitted through 8. With stopcock 6 open to a "bubble off," mercury level was returned to zero reading in gas collection bulb 23. At this point, atmospheric pressure of helium was present in all the unoccupied space from stopcock 3 to stopcock 8. This volume was known by prior calibration.

Mixed ethane-diborane was then admitted by cracking stopcock 1, stopcock 2 was opened and mixed gas admitted to graduated gas supply cylinder 13 until the desired amount, at atmospheric pressure, was present. Stopcocks 1 and 2 were closed, stopcock 3 opened and mercury addition was begun from mercury reservoir 15 to leveling bulb 14, generally at a rate of 5 cc. per minute. Mixed gas was thus transferred from graduated supply cylinder 13 to the carbon column 19 in jacketed reactor 16. By keeping the mercury leveling bulbs 14 and 24 at either end of the system adjusted, atmospheric pressure was maintained at all times. Constant temperature within carbon column 19 in jacketed reactor 16 was maintained by means of a thermostat. The remainder of the system was at room temperature which was maintained as close as possible to 25° C.

Effluent gas was collected and measured in graduated gas collection bulb 23. The experiment was stopped as soon as diborane was detected by filter paper strip 22 moistened with N/10 silver nitrate solution 21 contained in the well 20. Total volume of effluent gas was corrected for helium originally contained between stopcocks 3 and 4 and for vapor pressure of water due to the silver nitrate solution. The corrected volume represented for the amount of ethane fractionated free from diborane. This value was used in calculating the separation efficiency.

Effect of Carbon Column Length

Four carbon columns of varying length and about 1 cm. diameter were prepared and pretreated with boron trichloride as described above. The columns were jacketed to maintain 25° C. A gas mixture of ethane and diborane in a volume ratio of 6.31:1 respectively was prepared for use in all runs. This mixture was fed to the columns at a constant rate of 5 cc. per minute.

The experimental data are summarized in Table I below. From these data, the volume V (cc. S.T.P.) of 6.31:1 gas fed at atmospheric pressure to a column of length L (cm.) and 1 sq. cm. area at 25° C., up to the first appearance of diborane is given by the equation:

$$V = 68.125L - 294$$

The amount of pure ethane, $v$ (cc. S.T.P.) which has been expelled by the column at the same time is given by the equation:

$$v = 30.68L - 294$$

and the separation efficiency is given by the equation:

$$S = \frac{L - 9.582}{1.916L - 8.28} \times 100$$

This shows that as the length increases the separation efficiency increases and, for this gas mixture in a column operated as described, approaches an upper limit of 52%.

Effect of Feed Gas Composition

A carbon column 25.4 cm. long and 1 cm. diameter, containing 10.43 gm. of carbon, was pretreated as described and fed with four ethane-diborane mixtures as shown in Table 2 below (feed rate was 5 cc. per minute). The column was maintained at 25° C. and the mixed gas pressure at 760 mm. Hg.

It may be seen that there is a considerable effect of feed gas composition on separation efficiency. As diborane concentration increases, the separation efficiency for a given length column decreases.

TABLE 2.—EFFECT OF FEED GAS COMPOSITION ON SEPARATION EFFICIENCY

| Ratio, Ethane: Diborane | Total Gas Input, cc. S.T.P. | Ethane Input, cc. S.T.P. | Pure Ethane Recovered, cc. S.T.P. | Separation Efficiency, percent |
|---|---|---|---|---|
| 6.31:1 | 1,214 | 1,043 | 375.5 | 35.8 |
| 4.00:1 | 1,065 | 852 | 256 | 30.1 |
| 2.16:1 | 924 | 631.5 | 112.5 | 17.8 |
| 1.11:1 | 846 | 445 | 56 | 6.6 |
| 2.16:1 | 889 | 607.5 | 107 | 17.6 |

Effect of Temperature

Using the apparatus and experimental technique described, experiments were run with the jacket temperature at 23° and 35°. The results were:

| Temperature, °C. | $C_2H_6:B_2H_6$ Ratio | Separation Efficiency, percent |
|---|---|---|
| 23 | 5.31:1 | 10.07 |
| 35 | 5.36:1 | 10.8 |

It appears that, at least over this limited temperature range, temperature has little effect on the separation.

However, temperature is of importance since at about 40° C. measurable hydrogen evolution was observed, indicating some pyrolysis of the diborane. Experiments were run at 60° C. and 100° C. to determine whether carbon might catalyze diborane pyrolysis but the reaction at these temperatures proved to be slow. It is only necessary to avoid the higher temperatures to prevent loss of boron on the adsorbing carbon column.

Effect of Feed Rate on Column Temperature

It was observed that during adsorption on the carbon column, a narrow band of elevated temperature developed and progressed slowly along the length of the column.

To obtain a temperature profile during adsorption, a carbon column was prepared having an axial thermocouple well in a 38 by 1 cm. tube. It contained 10.98 gm. of carbon. A 6:1 ethane:diborane mixture was admitted and temperature measured at various points along the column. When the column was operated at a starting temperature of 30°–31° C., peak temperatures were observed as follows:

At 120 cc. per minute gas feed, 53° C.
At 60 cc. per minute gas feed, 49° C.
At 30 cc. per minute gas feed, 47° C.
At 15 cc. per minute gas feed, 45° C.

On displacing the adsorbed gases with boron trichloride at the same rates, peak temperatures between 78° and 71° C. were observed.

TABLE 1.—EFFECT OF COLUMN LENGTH ON SEPARATION EFFICIENCY

[Column temperature=25° C. Ratio of ethane to diborane in input gas=6.31:1]

| Tube Length, cm. | Tube Diam., cm. | Weight Carbon, gm. | Input and Output Gases Measured at— Barom. Pressure, mm. Hg | Input and Output Gases Measured at— Room Temp., °C. | Measured Gas Input, cc. | Ethane Input, cc. | Ethane Input/ sq. cm. (corrected to STP) | Ethane, Measured Output, cc. | Ethane Output (corrected to STP) | Separation Efficiency, Percent |
|---|---|---|---|---|---|---|---|---|---|---|
| 50.0 | 1.14 | 24.35 | 764.8 | 25.0 | 3,447 | 2,975 | 3,110 | 1,374 | 1,265 | 46.2 |
| 25.4 | 1.04 | 10.43 | 754.0 | 22.0 | 1,323 | 1,143 | 1,430 | 409 | 375.5 | 35.8 |
| 14.8 | 1.05 | 6.36 | 756.0 | 24.2 | 682 | 589 | 719.5 | 148 | 135.3 | 25.1 |
| 14.8 | 1.05 | 6.36 | 761.1 | 23.0 | 676 | 584 | 721 | 144.6 | 133.5 | 24.8 |

When the column was operated with a 0° C. jacket around it, peak temperatures were:

At 120 cc. per minute gas feed, 24° C.
At 60 cc. per minute gas feed, 19° C.
At 30 cc. per minute gas feed, 10° C.
At 15 cc. per minute gas feed, 7° C.

These experiments indicate that cooling of the carbon column may be necessary to avoid diborane pyrolysis.

ADSORPTION-DISPLACEMENT SEPARATION

The equipment employed in these experiments is shown in FIGURE 2 of the drawings wherein numbers 51 through 59 designate stopcocks, and numbers 60 and 61 designate 2-way valves in the system. The system itself includes mixed ethane-diborane gas supply cylinder 62, boron trichloride supply cylinder 63, flowmeters 64, 65 and 66, carbon columns 67 and 68 containing glass wool plugs 69, 70, 71 and 72, mercury "bubble-off" 73 and a twelve-bulb valved sampling and collection system 74.

Ethane and diborane (freed from hydrogen and higher boranes) were accurately measured in a calibrated portion of a high vacuum line (not shown) and were condensed into the 150 ml. stainless steel gas supply cylinder 62. The cylinder 62 was then attached to the line and the system evacuated through stopcock 53 with stopcocks 51, 52, 56 and 57 closed; stopcocks 53, 54 and 55 open. Carbon column 67 was 40 cm. long, 11 mm. in diameter and contained 17.93 gm. carbon which had been dried, pretreated with boron trichloride, evacuated with heating and backfilled with nitrogen as previously described.

After evacuation, dry nitrogen was admitted through stopcock 53 up to atmospheric pressure. Nitrogen volume in the system at this point was known by prior calibration. Stopcock 53 was then closed and stopcock 56 opened. Stopcock 51 was cracked and the ethane-diborane mixture (83% ethane–17% diborane) admitted at a rate of 60 cc. per minute until diborane was detected with silver nitrate moistened filter paper at stopcock 56. At this point 2080 cc. of mixed gas had been admitted and approximately 25% of the admitted ethane had been recovered free from diborane at stopcock 56. Stopcock 56 was then closed, stopcock 57 opened and the exit stream thus directed into carbon column 68. Carbon column 68 was of essentially the same dimensions as carbon column 67; it contained 17.86 gm. of carbon.

At this point, flow of mixed gas was shut off by closing stopcock 51 and boron trichloride was admitted at 60 cc. per minute by opening stopcock 52. These operations were equivalent to adsorbing ethane-diborane about half way down an 80 cm. long column of 35.79 gm. of carbon and subsequently displacing these gases into the remaining half of the column.

The remainder of the system had been prepared as follows: The carbon column 68 and line up to valve 60 had been evacuated and backfilled with nitrogen. The volume of nitrogen contained was known by prior calibration. The sampling system, including connections between stopcocks 60 and 61 and the 12-100 ml. sampling bulbs had been evacuated.

Stopcock 59 was opened and gas flow permitted until ethane was detected at which time stopcock 59 was closed, stopcock 60 opened and continuous sampling of the effluent stream begun by collection in successive sampling bulbs. Atmospheric pressure was maintained within the carbon column train by adjusting the sampling bulb stopcocks so as to maintain the level in the "bubble off."

An additional 60% of the original ethane was recovered in the sampling bulbs free from diborane (over-all recovery of pure ethane was thus 85% of the original amount admitted in the 2080 cc. of mixed gas). This was followed by a small fraction of mixed ethane-diborane and then pure diborane appeared. 75% of the diborane originally admitted was recovered pure. This was followed by a small fraction of mixed diborane-boron trichloride and then pure boron trichloride. Identification was by infra-red analysis. Total boron trichloride admitted prior to the appearance of pure boron trichloride at the exit was 5590 cc. From the data obtained previously on the effect of column length, it is possible to predict that the amount of mixed gases obtained could be reduced to a very small fraction by providing sufficient length. Required recycle of the mixed gases to effect further separation could thus be held to a minimum.

In a second experiment, diborane containing about 5% ethane was fed as described above until carbon column 67 had reached equilibrium saturation. (The exit gas at stopcock 56 had the same composition as the gas feed.) Carbon column 68 was then attached and boron trichloride introduced at 60 cc. per minute to displace the adsorbed gases in carbon column 67. Continuous sampling of the exit gas at stopcock 60 in the manner previously described showed that 70% of the adsorbed diborane in column 67 was displaced and recovered pure. The remainder consisted of mixtures of diborane with small amounts of ethane and diborane with boron trichloride. The appearance of pure boron trichloride at the exit occurred upon the admittance of 4400 cc. of boron trichloride to the carbon column train. This corresponds well with the amount of boron trichloride required in the previous displacement of a 6:1 ethane-diborane mixture.

We claim:
1. A process for the desorption of diborane from activated carbon having diborane adsorbed thereon which includes passing a boron halide selected from the class consisting of boron trichloride and boron trifluoride into intimate contact with a confined body of activated carbon having diborane adsorbed thereon, and withdrawing diborane.

2. The process of claim 1 wherein the boron halide is boron trichloride.

3. A process for the treatment of a gaseous admixture of ethane and diborane to provide a gaseous admixture of enriched ethane content and a gaseous admixture of enriched diborane content which includes passing a gaseous admixture comprising ethane and diborane into intimate contact with a confined body of finely divided activated carbon, withdrawing a gaseous admixture of enriched ethane content, replacing the gaseous admixture comprising ethane and diborane passing into the confined body of finely divided activated carbon with a boron halide selected from the class consisting of boron trichloride and boron trifluoride, and separately withdrawing a gaseous admixture of enriched diborane content.

4. The process of claim 3 wherein the boron halide is boron trichloride.

5. A process for the treatment of a gaseous admixture of ethane and diborane to provide a gaseous admixture of enriched ethane content and a gaseous admixture of enriched diborane content which includes passing a gaseous admixture comprising ethane and diborane into intimate contact with a confined body of finely divided activated carbon, withdrawing a gaseous admixture of enriched ethane content, replacing the gaseous admixture comprising ethane and diborane passing into the confined body of finely divided activated carbon with a boron halide selected from the class consisting of boron trichloride and boron trifluoride, separately withdrawing a gaseous admixture of enriched diborane content, terminating the passage of boron halide passing into the confined body of finely divided activated carbon, and desorbing the boron halide from the confined body of finely divided activated carbon.

6. The process of claim 5 wherein the boron halide is boron trichloride and wherein the boron trichloride is desorbed by subjecting the confined body of finely divided activated charcoal to vacuum and heat.

7. The process of claim 5 wherein the boron halide is boron trichloride and wherein the boron trichloride is desorbed by passing therethrough an inert gas.

8. The process of claim 7 wherein the inert gas is nitrogen.

9. A process for the separation of ethane and diborane from a gaseous admixture comprising ethane and diborane which includes passing a gaseous admixture comprising ethane and diborane into the inlet end of an elongated adsorption zone into intimate contact with a confined body of finely divided activated carbon maintained in the elongated adsorption zone, withdrawing ethane from the exit end of the adsorption zone until diborane is present in the gaseous admixture passing a point approximately halfway intermediate the inlet and exit ends of the adsorption zone, replacing the gaseous admixture comprising ethane and diborane passing into the inlet end of the adsorption zone with boron trichloride, continuing to withdraw ethane from the exit end of the adsorption zone until diborane is present in the withdrawn gas, separately withdrawing a gaseous admixture of ethane and diborane until the withdrawn gas is substantially pure diborane, separately withdrawing diborane until boron trichloride is present in the withdrawn gas, separately withdrawing a gaseous admixture of diborane and boron trichloride until the withdrawn gas is substantially pure boron trichloride and desorbing the boron trichloride from the confined body of finely divided activated carbon.

10. The process of claim 9 wherein the gaseous admixture of ethane and diborane withdrawn from the exit end of the adsorption zone is recycled.

11. The process of claim 9 wherein the gaseous admixture of diborane and boron trichloride withdrawn from the exit end of the adsorption zone is recycled.

References Cited in the file of this patent

UNITED STATES PATENTS

| | | |
|---|---|---|
| 2,799,360 | Miller | July 16, 1957 |
| 2,987,139 | Bush | June 6, 1961 |
| 2,997,371 | Wadsworth et al. | Aug. 22, 1961 |

OTHER REFERENCES

Mantell: Adsorption, Second Edition, McGraw-Hill Book Co., New York, 1951, pages 15, 16, 153, 162, 317, 318, 324, 325, 395, and 399.

Nuclear Science Abstracts: vol. 9, No. 53, 1955; vol. 12, No. 2716, 1958.